United States Patent
Iorio

(10) Patent No.: US 10,563,392 B2
(45) Date of Patent: Feb. 18, 2020

(54) STORMWATER BIOFILTRATION SYSTEM AND METHOD

(71) Applicant: Paul Anthony Iorio, Pawtucket, RI (US)

(72) Inventor: Paul Anthony Iorio, Pawtucket, RI (US)

(73) Assignee: MMT, INC. RI (US)

( * ) Notice: Subject to any disclaimer, the term of this patent is extended or adjusted under 35 U.S.C. 154(b) by 0 days.

(21) Appl. No.: 15/735,940

(22) PCT Filed: Aug. 10, 2016

(86) PCT No.: PCT/US2016/046438
§ 371 (c)(1),
(2) Date: Dec. 12, 2017

(87) PCT Pub. No.: WO2017/027644
PCT Pub. Date: Feb. 16, 2017

(65) Prior Publication Data
US 2018/0179748 A1    Jun. 28, 2018

Related U.S. Application Data

(60) Provisional application No. 62/203,618, filed on Aug. 11, 2015, provisional application No. 62/253,752, (Continued)

(51) Int. Cl.
*C02F 3/32* (2006.01)
*E03F 5/04* (2006.01)
(Continued)

(52) U.S. Cl.
CPC ............ *E03F 5/0404* (2013.01); *C02F 1/004* (2013.01); *C02F 3/046* (2013.01); *C02F 3/327* (2013.01);
(Continued)

(58) Field of Classification Search
CPC ......... E03F 1/002; E03F 5/0404; E03F 5/046; E03F 5/103; C02F 3/046; C02F 3/32; C02F 3/327
(Continued)

(56) References Cited

U.S. PATENT DOCUMENTS 3,770,623 A    11/1973 Seidel
3,894,355 A *  7/1975 Carothers .............. A01G 9/022
                                                       210/602
(Continued)

FOREIGN PATENT DOCUMENTS

AU    2008201960 B2    11/2009
CH    674 034 A5    4/1990
(Continued)

OTHER PUBLICATIONS

Foster RS and Blaine J, (1977), 'Urban Tree Survival: Trees in the Sidewalk,' J Arboricult, 4(1):14-7.
(Continued)

*Primary Examiner* — Christopher Upton
(74) *Attorney, Agent, or Firm* — Perry + Currier Inc.; Alan F. Feeney

(57) ABSTRACT

A stormwater treatment system and method for removing sediment, chemical pollutants, and debris from stormwater runoff by utilizing bioretention practices including physical, chemical and biological processes. Stormwater is directed into a primarily open-bottomed, multi-dimensional container whereby entrained sediment and other transportable materials are filtered and treated through a media filter layer consisting of inorganic and/or organic materials. A live plant (preferably a tree) situated within the container with roots resident in the media filter layer with the ability for expansion beyond the perimeter of the container through openings in one or more sidewalls. The treated water may be further
(Continued)

conveyed beyond the perimeter of the container by additional openings and/or piping. A vertically positioned overflow/bypass/clean out piping apparatus may be included within the stormwater treatment system to provide additional water conveyance. Additional ancillary conveyance, filtration and storage facilities may be connected to the described stormwater treatment system as conditions warrant.

15 Claims, 7 Drawing Sheets

Related U.S. Application Data filed on Nov. 11, 2015, provisional application No. 62/314,622, filed on Mar. 29, 2016.

(51) Int. Cl.
| | |
|---|---|
| C02F 1/00 | (2006.01) |
| E03F 1/00 | (2006.01) |
| E03F 5/046 | (2006.01) |
| C02F 3/04 | (2006.01) |
| C02F 103/00 | (2006.01) |

(52) U.S. Cl.
CPC .............. *E03F 1/002* (2013.01); *E03F 5/046* (2013.01); *C02F 2103/001* (2013.01)

(58) Field of Classification Search
USPC .......................... 210/150, 151, 170.03, 602
See application file for complete search history.

(56) References Cited

U.S. PATENT DOCUMENTS

| | | | |
|---|---|---|---|
| 4,019,279 | A | 4/1977 | Moorman et al. |
| 4,218,318 | A | 8/1980 | Niimi et al. |
| 4,537,687 | A | 8/1985 | Piper |
| 4,839,051 | A | 6/1989 | Higa |
| 5,322,629 | A | 6/1994 | Stewart |
| 5,437,786 | A | 8/1995 | Horsley |
| 5,549,817 | A | 8/1996 | Horsley |
| 5,624,576 | A | 4/1997 | Lenhart et al. |
| 5,702,593 | A | 12/1997 | Horsley |
| 5,707,527 | A * | 1/1998 | Knutson ............... E03F 5/14 210/170.03 |
| 5,725,760 | A | 3/1998 | Monteith |
| 5,728,305 | A | 3/1998 | Hawkinson |
| 5,746,911 | A | 5/1998 | Pank |
| 5,759,415 | A | 6/1998 | Adams |
| 5,788,848 | A | 8/1998 | Blanche et al. |
| 5,849,069 | A | 12/1998 | Grabosky et al. |
| 5,985,157 | A | 11/1999 | Leckner et al. |
| 6,027,639 | A | 2/2000 | Lenhart, Jr. et al. |
| 6,132,603 | A | 10/2000 | Mokrzycki et al. |
| 6,277,274 | B1 | 8/2001 | Coffman |
| 6,350,374 | B1 | 2/2002 | Stever et al. |
| 6,406,218 | B1 | 6/2002 | Olson |
| 6,511,595 | B2 | 1/2003 | Crompton et al. |
| 6,569,321 | B2 | 5/2003 | Coffman |
| 6,592,761 | B2 * | 7/2003 | Wofford ............... C02F 3/04 210/602 |
| 6,641,720 | B1 | 11/2003 | Crompton et al. |
| 6,649,048 | B2 | 11/2003 | de Ridder et al. |
| 6,783,683 | B2 | 8/2004 | Collings |
| 6,869,528 | B2 | 3/2005 | Pank |
| 6,905,599 | B2 | 6/2005 | Allard |
| 6,991,114 | B2 | 1/2006 | Allen, II et al. |
| 6,991,402 | B2 | 1/2006 | Burkhart |
| 6,998,038 | B2 | 2/2006 | Howard |
| 7,022,243 | B2 | 4/2006 | Bryant |
| 7,080,480 | B2 | 7/2006 | Urban et al. |
| 7,160,058 | B2 | 1/2007 | Burkhart |
| 7,186,058 | B2 | 3/2007 | Schluter et al. |
| 7,186,333 | B2 | 3/2007 | Kluge |
| 7,296,692 | B2 | 11/2007 | Allen, II et al. |
| 7,297,266 | B2 | 11/2007 | Cobb et al. |
| 7,344,335 | B2 | 3/2008 | Burkhart |
| 7,425,261 | B2 | 9/2008 | Siviter et al. |
| 7,425,262 | B1 | 9/2008 | Kent |
| 7,470,362 | B2 | 12/2008 | Kent |
| 7,625,485 | B2 | 12/2009 | Siviter et al. |
| 7,638,065 | B2 | 12/2009 | Stever |
| 7,674,378 | B2 | 3/2010 | Kent |
| 7,776,217 | B2 | 8/2010 | Lucas |
| 7,833,412 | B2 | 11/2010 | Holtz |
| 7,967,979 | B2 | 6/2011 | Grewal et al. |
| 7,985,335 | B2 | 7/2011 | Allard |
| 8,110,105 | B2 | 2/2012 | Allen, II et al. |
| 8,333,885 | B1 | 12/2012 | Iorio |
| 8,535,533 | B2 | 9/2013 | Allard |
| 8,771,515 | B2 | 7/2014 | Kent et al. |
| 2004/0226869 | A1 | 11/2004 | McClure et al. |
| 2007/0068878 | A1 | 3/2007 | Stever et al. |
| 2008/0121594 | A1 | 5/2008 | Dierkes |
| 2008/0142438 | A1 | 6/2008 | Kent |
| 2008/0217227 | A1 | 9/2008 | Pank |
| 2008/0217257 | A1 | 9/2008 | Pank |
| 2008/0251448 | A1 | 10/2008 | Kent |
| 2009/0050583 | A1 | 2/2009 | Arnott et al. |
| 2009/0084601 | A1 | 4/2009 | Masinter et al. |
| 2009/0250405 | A1 | 10/2009 | Allard |
| 2009/0261036 | A1 | 10/2009 | Lucas |
| 2011/0147303 | A1 | 6/2011 | Allard |
| 2011/0186492 | A1 | 8/2011 | Holtz |
| 2012/0031854 | A1 | 2/2012 | Allard |
| 2012/0111780 | A1 | 5/2012 | Allen, II et al. |
| 2012/0152827 | A1 | 6/2012 | Allard |
| 2013/0092632 | A1 | 4/2013 | Allard |
| 2013/0105387 | A1 * | 5/2013 | Antoinette ............. C02F 3/327 210/602 |
| 2013/0140229 | A1 | 6/2013 | Allen et al. |
| 2013/0213869 | A1 | 8/2013 | Allard |
| 2013/0299403 | A1 | 11/2013 | Drake |
| 2014/0138307 | A1 | 5/2014 | Coffman et al. |
| 2014/0154006 | A1 | 6/2014 | Thomas |
| 2014/0367328 | A1 | 12/2014 | Allard |
| 2017/0254062 | A1 | 9/2017 | Fink et al. |
| 2018/0228094 | A1 * | 8/2018 | Iorio .................. A01G 13/0237 |
| 2018/0235158 | A1 * | 8/2018 | Iorio .................. A01G 13/0237 |

FOREIGN PATENT DOCUMENTS

| | | |
|---|---|---|
| CN | 104126439 A | 11/2014 |
| CN | 104532942 A | 4/2015 |
| DE | 87 10 209 U1 | 10/1987 |
| DE | 90 14 587 U1 | 1/1991 |
| DE | 10 2004 001 919 A1 | 9/2005 |
| FR | 2 743 581 | 2/1998 |
| KR | 10181568 B1 | 11/2011 |
| KR | 101343005 B1 | 12/2013 |
| KR | 101552425 B1 | 6/2015 |
| WO | WO 00/50142 | 8/2000 |
| WO | WO2017/044920 A1 | 3/2017 |

OTHER PUBLICATIONS

International Search Report for International Application No. PCT/US2016/046438 (Form ISA/210) dated Jan. 19, 2017 (4 pages).
International Search Report for International Application No. PCT/US2016/051205 (Form ISA/210) dated Dec. 28, 2016 (3 pages).
Nowak DJ et al., (2004), 'Tree Mortality Rates and Tree Population Projections in Baltimore, Maryland, USA,' Urban for Urban Gree, 2(3):139-47.
Written Opinion of the International Searching Authority for International Application No. PCT/US2016/046438 (Form ISA/237) dated Jan. 19, 2017 (6 pages).
Written Opinion of the International Searching Authority for International Application No. PCT/US2016/051205 (Form ISA/237) dated Dec. 28, 2016 (8 pages).

(56) References Cited

OTHER PUBLICATIONS

European Patent Office, Extended European Search Report (EPO Form 1507S), dated Jul. 17, 2018 (9 pages).

* cited by examiner

FIGURES 3a, 3b, and 3c

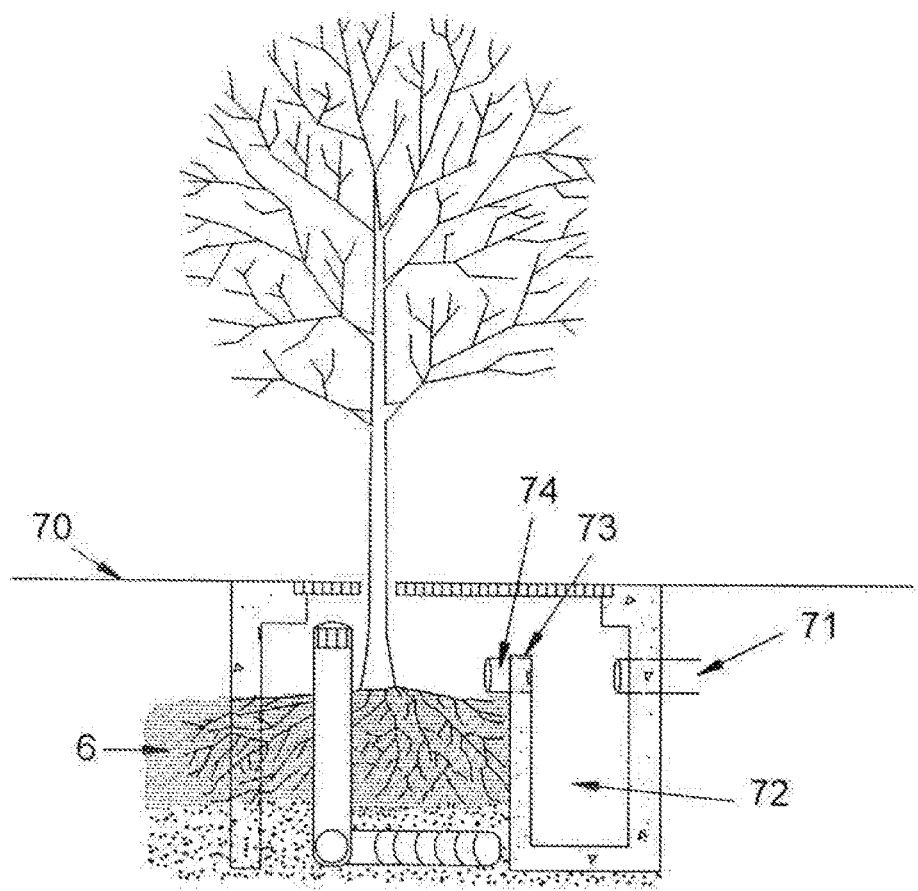
FIG. 5a
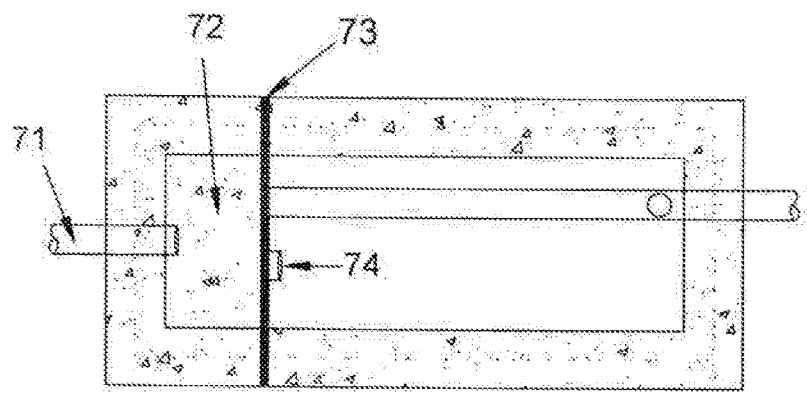
FIG. 5b
FIGURES 5a and 5b

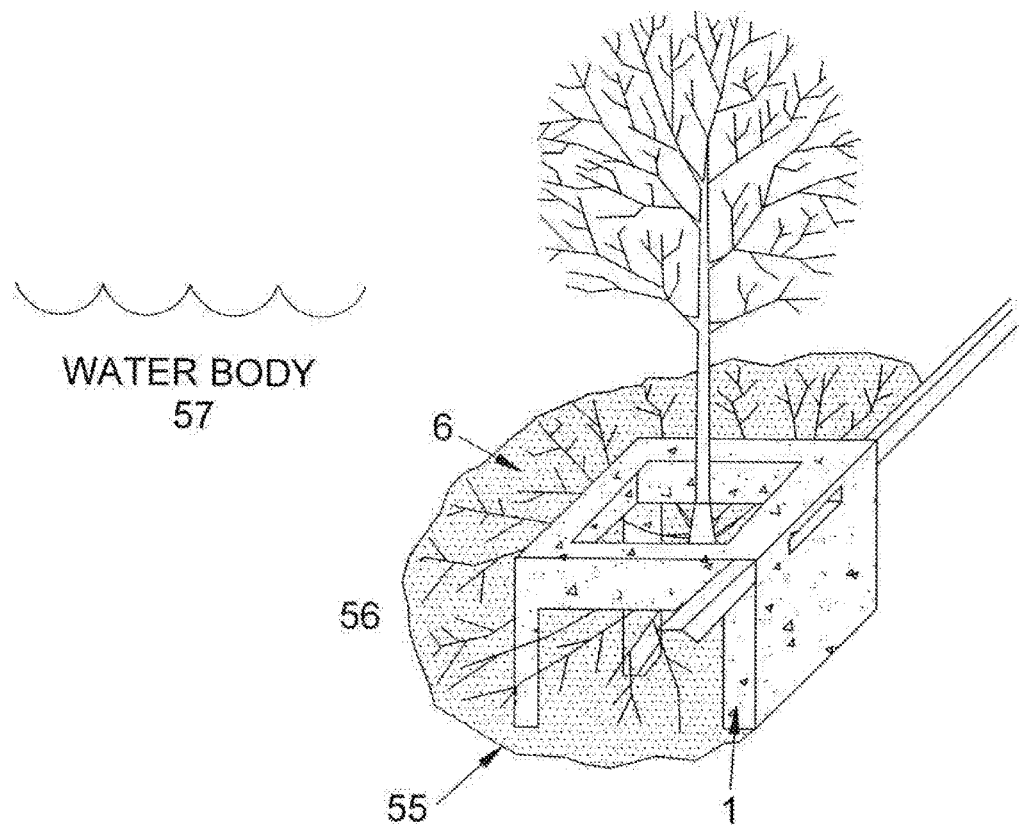
FIG. 7a
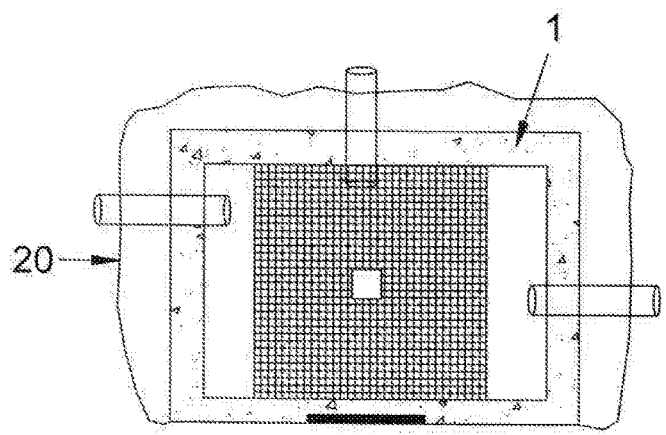
FIG. 7b
FIGURES 7a and 7b

STORMWATER BIOFILTRATION SYSTEM AND METHOD

CROSS-REFERENCE TO RELATED APPLICATION

This application is a continuation under 35 U.S.C. § 371 of International Application No. PCT/US2016/046438 filed on Aug. 10, 2016, which claims priority to and the benefit of U.S. Provisional Patent Application No. 62/203,618 filed Aug. 11, 2015, U.S. Provisional Patent Application No. 62/253,752, filed Nov. 11, 2015, and U.S. Provisional Patent Application No. 62/314,622 filed Mar. 29, 2016, the entire contents of each are incorporated by reference herein.

FIELD OF THE INVENTION

The application relates to a filtration system, method, and device to manage and improve the quality of stormwater runoff by removing and remediating pollutant constituents entrained in the water by way of physical, chemical, and biological processes. The invention intended to collect and process stormwater emanating from paved and unpaved surfaces, underground utilities, as well as from building roof drain structures.

BACKGROUND OF THE INVENTION

Stormwater runoff transports varying quantities of pollutants such as oil/grease, phosphorous, nitrogen, bacteria, heavy metals, pesticides, sediments, and other inorganic and organic constituents with the potential to impair surficial water bodies, infiltrate groundwater and impact aquifer systems. The systemic sources of these pollutants are referred to as either 'point' or 'nonpoint' (sources). Point source pollution is typically associated with a release such as a spill, or "end of pipe" release from a chemical plant. These are considered releases that can be tracked to a single location. Nonpoint source pollution is not readily discernible with respect to a single location, but is associated with combined pollutant loading and deposition from many sources spread out over a large area including a variety of human activities on land (e.g., excess fertilizer runoff), vehicle emissions (e.g., oil, grease, antifreeze), vehicle material wear (e.g., brake pads, metal on metal rubbing, corrosion), as well as natural characteristics of the soil and erosion, climate, and topography. Sediment transport is the most common form of nonpoint source pollution as it can contain a myriad of soluble and insoluble pollutants, comingled and concentrated and easily transported over impervious and pervious surfaces. Nonpoint source pollution via stormwater runoff is considered to be the primary contributing factor in water degradation. Over the past three decades, many studies have been performed to identify the major pollutant constituents typically found in stormwater, and their relative concentrations found in both urban and suburban runoff. Studies have consistently concluded that pollutant levels, particularly in urban runoff, contain concentrations of nutrients and other pollutants, with the potential to significantly impact receiving waters such as streams, lakes, rivers, as well as our underground groundwater aquifer system.

Pollutants in both soluble and insoluble forms such as nitrogen, phosphorous, zinc, copper, petroleum hydrocarbons, and pesticides at various concentrations are commonly found in the stormwater profile. These constituents maintain varying degrees of solubility and transport with some being more mobile than others. Some constituents have a chemical affinity to "sorb" (adsorb/absorb) and collect, or, "hitch a ride," onto sand particles, sediment, or other non-aqueous matter entrained in the stormwater during transport, thereby increasing the mass of concentration. Sediment laden pollution can also impair waterways due to increased levels of turbidity thereby decreasing sunlight penetration within water bodies, and impairing aquatic life.

Historically, stormwater management systems have relied on collection and conveyance via a network of catchments and underground piping that typically transfer and discharge stormwater to a downgradient water body. Additionally, the practice of stormwater detention and/or retention which relies on the collection or transfer of stormwater to surficial ponds or holding areas whereby infiltration takes place, has been a preferred management technique. Both of these management techniques are commonly referred to as "centralized" techniques which were designed primarily to move stormwater from paved areas, without consideration of the pollutant loading effect.

Beginning in the early 1980's, academia, municipalities, state and federal environmental regulatory agencies began looking at ways to best mitigate problems associated with nonpoint source pollution and stormwater runoff. Instead of relying solely on centralized stormwater collection and conveyance, a more "decentralized" approach to stormwater management began to evolve. Such traditional physical factors in determining stormwater control practices as site topography soil percolation rates, and degree of impervious cover were integrated with strategic land planning in an attempt to best replicate pre-development conditions and preserve the natural process of direct subsurface infiltration of precipitation. The focus turned to ways in which innovative engineering, and systems design and construction practices in new development and redevelopment could best be employed to reduce the impact from increasing the impervious "footprint" thereby minimizing site impact. The term "best management practices" (BMPs) was used to collectively identify various stormwater control practices and methodologies to achieve decentralized versus centralized management by treating water at its source, instead of at the end of the pipe.

Low impact development (LID) is a term used to described a land planning, engineering, and building design approach to managing stormwater runoff. LID emphasizes conservation and use of on-site natural features to protect water quality. This approach implements engineered small-scale hydrologic controls to replicate or mimic the pre-development hydrologic regime of watersheds through infiltrating, filtering, storing, evaporating and detaining runoff close to its source. The LID concept began in Prince George's County, Md. around 1990 by municipal officials as an alternative to traditional centralized control measures. These officials found that traditional practices of detention and retention and associated maintenance were not cost-effective, and many cases, did not meet stormwater management goals, particularly with respect to water quality goals.

Today, LID stormwater management practices have shown in many cases to reduce development costs through the reduction or elimination of conventional storm water conveyance and collection systems and infrastructure. Furthermore, LID systems may reduce need for paving, curb and gutter fixtures, piping, inlet structures, and stormwater ponds by treating water at its source instead of at the end of the pipe. Although up-front costs for LID practices can be higher than traditional controls, developers often recoup these expenditures in the form of enhanced community marketability, and higher lot yields. Developers are not the only parties to benefit from the use of LID atom water management techniques, municipalities also benefit in the long term through reduced maintenance costs.

Of particular interest in regard to the present invention is a BMP practice based on the principals of "bioretention." Bioretention is typically defined as the filtering of stormwater runoff through a plant/soil complex to capture, remove, and cycle pollutants by a variety of physical, chemical, and biological processes. Bioretention is a practice that relies on gravity to allow stormwater to infiltrate through natural soil or engineered filter "media" complexes while providing some degree of sediment collection/separation, and encouraging microbial degradation of entrained pollutants. Such bioretention practices as "rain gardens" and "sand filters" which rely on infiltration and natural pollutant attenuation began to be incorporated as part of LID practices beginning in the 1990's. In these systems, the ability and rate of water movement is not based upon structural controls, but more a function of the composition of the media and/or soils and the infiltration capacity. Although sand filters provide some degree of bioretention efficacy, more importantly, rain gardens rely on plant systems to further enhance microbial activity, and assimilate and uptake pollutant constituents such as phosphorous, nitrogen, and various metals in their soluble form. Accumulated test data of pollutant removal rates for bioretention practices have consistency shown high levels of control and attenuation. Federal and state environmental protection agencies recognize infiltration practices as the preferred means for returning rainwater runoff to the natural aquifer system, as opposed to piping and discharging collected stormwater to a downgradient water body location such as a river, lake, or the ocean.

Within the past decade, another BMP practice/system which relies on infiltration and bioretention to achieve pollutant removal goals has emerged. This system typically integrates a landscape tree or other plant material with stormwater collection and remediation through an engineered filter media. The system is commonly referred to as a "tree box filter" system. The University of Hampshire Stormwater Center (UNHSC) was one of the earliest institutions to construct and test a tree box filter system. In 2007, UNHSC installed a tree box filter system at their campus test center. The system as designed was an approximately six-foot diameter, three-foot deep, round concrete vault resembling a large inverted concrete pipe. It was filled with a bioretention soil mix composed of approximately 80 percent sand and 20 percent compost. It was underlain horizontally by a perforated "underdrain" pipe at the base of the vault that was connected to, and discharged infiltrated stormwater to an existing stormwater drainage system.

The system also contained an open-topped, vertical bypass pipe near the surface to accommodate heavy stormwater events which would otherwise overwhelm the concrete vault. The vault was open-bottomed to provide some direct infiltration to the underlying soils. The filter media was approximately three feet deep and was designed to maximize permeability while providing organic content by the incorporation of compost and native soils to sustain the tree. The vault was designed to be integrated with a street curb opening to collect surface runoff. During a rain event, stormwater migrating along a street curb would enter the curb cut opening and the vault system. The water then infiltrated through the media and was primarily conveyed through the sub drain pipe to the existing (separate) stormwater drainage system. Although the device had the capability of infiltrating stormwater to the surrounding environment through the open bottom, it principally relied on the sub drain pipe to convey stormwater to the existing drainage system.

Most recently several proprietary tree box filter systems, and other structural bioretention systems, have been introduced for commercial use and are currently marketed as stormwater treatment devices, for the collection, filtration, and discharge of (treated) stormwater. As with the previously described UNHSC system, these systems are primarily vault systems with enclosed walls. They typically are constructed as a water impermeable precast concrete container with four side walls with a perforated horizontal underdrain pipe located at the base of the container. However, in contrast to the aforementioned UNHSC design system, these proprietary systems typically have a water impermeable bottom wall essentially forming a five-sided container, with a partially open top sidewall to allow for plant growth. They are designed to be integrated with street curbside collection with stormwater entering the system via an opening (throat) on one side of the container. The container typically contains a filter media of specific composition, with an overlying organic mulch media layer. The drain pipe collects and conveys filtered stormwater to an outlet point exterior of the container that is typically connected to a downgradient catch basin or other existing stormwater drainage system structure. The drain pipe is typically embedded in a layer of stone to facilitate collection and transport of all infiltrating water to the outlet point. The collection and treatment capacity of these close sided systems are defined by the horizontal and vertical interior dimensions of the container. Plant material is resident in the container with root growth confined within the container. These systems are designed to collect and infiltrate stormwater emanating from aboveground surfaces, underground storm drains, and building roof runoff. Based on third party evaluation and testing data, these systems have proven to provide effective stormwater quality treatment with the capacity to provide substantial pollutant removal rates.

Although tree box filters and other closed box systems have proven to be an effective pollutant removal technology, several perceived deficiencies to their long term efficacy have been identified, which are inspiration and basis of the present invention.

Since tree box filter systems inherently closed systems, both the filter media and plant root systems are contained within a five-sided box, therefore, their identifying name. Not unlike a "pot bound" potted plant, the roots of the plant (particularly trees) within a tree box filter are confined and restricted normally developing and freely migrating beyond the walls of the container.

It is common knowledge that the majority of tree root growth is in a horizontal versus vertical direction. Roots primarily grow and spread laterally outward, and away from the tree trunk in search of nourishment to include water, nutrients and oxygen. Based on documented studies and an accepted understanding of tree root growth by the arboriculture and horticulture community, as well as an evaluation of tree root systems following disturbance or "wind throw", as much as 80% of a mature tree's root system typically resides in the top 12 inches of soil. Therefore, a tree's root mass exists, and growth takes place, within a shallow horizontal matrix. It is also understood that a tree's roots normally grow to and beyond the distance of its canopy, or outer perimeter of leaf growth, typically by a factor of two or three times the distance between the trunk and outer edge of the canopy. Therefore, a healthy and thriving tree would require an extensive and unobstructed horizontal dimension to develop properly.

A majority of commercial proprietary tree box system containers encompass less than 40 square feet in horizontal dimension. Due to the aforementioned discussion of root growth requirements, an actively growing containerized tree, as typified by a tree box system, would be expected to "outgrow" its horizontal dimension prior to attaining maturity. The negative consequences from the exhaustion of growing area, and the adverse effects of restricting a tree's root system from expanding normally could be the stunting of growth, decline in health, and potential susceptibility to disease and insect infestation. Furthermore, actively growing roots will be deflected in opposing directions following contact with an impenetrable obstacle such as the wall(s) of a tree box container. These roots have the potential to encircle the tree's trunk causing a condition called "girdling" whereby the encircling roots can strangle the tree's trunk as well as other developing roots, choking off nourishment. These debilitating factors could potentially lead to the premature death of the tree. If the tree in a tree box system requires removal and replacement due to decline or premature death, significant labor and material costs would be incurred. To facilitate tree removal, presumably most, if not all of the media within the container would also require removal. This associated cost and labor burden could further be exacerbated due to the potential need to remove existing stone surrounding the aforementioned underdrain piping at the base of the container of the typical tree filter system.

Another perceived deficiency due to the effect of the "consumption" of media space by the ever increasing mass of root growth within the confined space of a tree box system would be the eventual reduction of stormwater movement and infiltration through the media filter. Most commercial tree box filter systems depend on rapid stormwater infiltration through the media to achieve treatment goals. The typical tree box filter media is purposely engineered to be of a highly porous open structure composition, primarily consisting of larger particle gravelly sands, thus providing rapid infiltration, as opposed to common landscape or garden soils that typically contain finer particles of sands, silts, and clay that inhibit rapid infiltration. A lesser percentage of the media mix is typically made up of these latter constituents as well as organic materials such as peat moss or compost that have the ability to absorb and retain water. These constituents are critical in providing irrigation for the tree and to sustain root growth, as well as promoting microbial growth for the degradation of some pollutants. However, it is apparent that the ever expanding network of roots of a maturing tree confined within a tree box would be expected (in time) to interfere with and slow down the infiltration of stormwater, thus reducing operational efficiency of the system.

An additional perceived deficiency with a conventional commercial tree box filter is that since these systems are primarily closed bottomed, the only means to discharge infiltrated stormwater outside of the tree box is by way of the underdrain pipe. Since this pipe is typically connected a downgradient catch basin, or other closed stormwater management system, there is little opportunity to directly infiltrate quantities of this filtered water to surrounding soils and the groundwater system. If the surrounding soils are sufficiently permeable, as previously explained, direct infiltration is the preferred mode for returning rain water, in the form of treated stormwater, to the groundwater system. Therefore, an open bottomed tree filter system could allow quantities of filtered stormwater to be returned to surrounding subsurface soils and ultimately the groundwater system. Additionally, commercial tree box filter systems typically utilize a four or six-inch diameter drain pipe as the sole means to discharge filtered water from the system container. The quantity of water, and speed for which water could be evacuated from the container, are therefore severely limited due to the use of a small diameter outlet pipe as opposed to an open bottomed system such as the present invention.

As previously discussed, tree box filter systems (and other enclosed bioretention based structures) rely on an engineered media of high porosity that allows for the rapid infiltration of stormwater that is entering the system. These medias are composed of inorganic materials to allow for rapid infiltration, and organic materials which retain water within the media to provide irrigation for the plant material. When both inorganic and organic constituents are blended in correct proportions, the resulting engineered media provides a proper balance of high infiltration capacity coupled with sufficient water holding capacity.

Recent studies have determined that the incorporation of specific manufactured products or reconstituted rock-based materials formed by expanding specific minerals under intense heat, often referred to as "ceramics", into an engineered media that has the capacity to adsorb and absorb (sorption) nutrients commonly found in stormwater runoff. Excessive concentrations of specific nutrients such as nitrogen, phosphorus, and soluble metals are known to pollute soils and water bodies. Sorption occurs as a chemical or physical bonding process where nutrients become "attached" to a material as it passes in aqueous solution. Manufactured products such as activated aluminum and activated iron have shown a great affinity for the sorption of soluble phosphorus and other minerals in the aqueous stage. The incorporation of these materials in an engineered media have shown to provide a measurable reduction in soluble phosphorus in stormwater runoff influent. Ceramics such as expanded shale and expanded clay have also shown a propensity for adsorbing minerals such as phosphorus and nitrogen. The mechanism for this sorption reaction is due mainly in part to the presence of tiny holes and fissures within the lattice of the ceramic structure. These holes and fissures are the result of the artificially induced intense heating of the expanded rock during the manufacturing process that causes the material to "pop", forming these openings.

Water treatment plant processes employ manufactured products such as coagulants to remove inorganic and organic matter suspended in the untreated source water. Coagulants have the ability to bind small contaminant particles that are suspended in water which otherwise would avoid initial treatment. Water Treatment Residuals (WTRs) are the products produced following this coagulation process, and treatment process. This resulting product may be a thickened liquid or a dewatered solid, in the solid form, these coagulant residual materials may be either aluminum or iron base oxides and are known to have a strong capacity to retain soluble phosphorus. It has been determined that aluminum and iron based WTRs, when exposed to stormwater influent can continue to capture and retain over 90% of soluble phosphorus, even after several years of continued contact.

Incorporating any of these manufactured products including, reconstituted rock, and/or WTRs at no greater than 20% (±5%) by volume with a high infiltrating engineered media achieving an infiltration capacity of greater than 50 (±5) inches per hours would be expected to provide a pollutant removal benefit in systems such as the present invention.

Manufactured tree box filter systems and other enclosed bioretention based structures are currently being used in many parts of the country in both commercial and residential applications where a stormwater management system is essential to mitigate non-point source pollution. These systems are typically manufactured of precast concrete by concrete manufacturers or their affiliates. They are customarily delivered pre-filled with filter media and arrive at a site ready for installation and the incorporation of the final plant product. The primary intent of a closed box system design prefilled with media is to be one of a "packaged" and "drop in place" product, uniform in construction, thereby expediting installation and reducing handling time and associated costs. Essentially closed-bottomed and closed-sided pre-cast concrete water impermeable treatment containers are described in U.S. Pat. Nos. 8,333,885, 6,277,274, 6,569,321, and 8,771,515.

Several advantages to the present invention as to be detailed in the following description are designed to rectify the perceived deficiencies in current tree box filter systems, as well as provide additional benefit. Some of these advantages include, an open sided and open bottomed design to allow for direct infiltration; incorporating an engineered media amended with a manufactured product(s) or reconstituted rock-based materials to provide greater nutrient pollutant removal efficacy; the ability to service street, and building roof runoff; allow for multiple subsurface pipe openings; and, the ability to use a flexible, impermeable or substantially permeable subsurface liner to provide an enclosed treatment area. These, and other advantages will become apparent from a consideration of the following description and accompanying drawings.

BRIEF SUMMARY OF THE INVENTION

The present invention is intended to be a stormwater treatment system with bioretention functionality and is designed to treat stormwater runoff emanating from either previous or impervious surfaces (e.g., streets, parking lots, grassed areas, roof tops). An embodiment consists of a primarily open-bottomed container with a top sidewall at least partially open to the atmosphere, and side walls of varying vertical dimension. The container contains a filter media consisting of a mixture of organic and non-organic materials. Portions of the filter media on one or more sides of the container may maintain contact or otherwise communicate with the surrounding native or existing soil. Plant material will be located within the container with vegetative growth emanating through a central opening(s) in the top sidewall portion of the container, with at least partial, or free expression of the attended root system beyond the exterior "footprint" of the container.

This and other embodiments and features of the present invention will become apparent from the following detailed description, accompanying illustrative drawings, and appended claims.

DEFINITIONS

The following terms are defined to aid the reader in fully understanding the operation, function, and utility of the present invention.

"Accumulating stormwater" as used herein, refers to conditions when the system is inundated with a large volume of stormwater due to a severe storm, such as a hurricane, or a long and/or intense period of rain.

"Affixed" as used herein, refers to the possibility that one or more things may be connected, by a variety of means, including, but not limited to a fastening device, such as a hinge, bolt, screw, rebar or the like, and adhesive, such as an epoxy, or a preformed interlocking groove or cutout. Affixed also takes into consideration joining two parts during the manufacturing process wherein the two claimed parts are manufactured as one complete part.

"And/or" as used herein, refers to the possibility that both items or one or the other are claimed. For instance, A and/or B refers to the possibility of A only, B only or both A and B are present in the claimed invention.

"Aggregate media" as used herein, refers to a sum, mass, or assemblage of various loose particles of inorganic and/or organic matter.

"Base" refers to the bottom or lowest part of something; the part on which something rests or is supported.

"Bioretention functionality" as used herein, refers to the functioning process in which nutrients, contaminants and aggregate media particles are removed from stormwater runoff through a combination of physical, chemical and biological processes as the water infiltrates and passes through the media layers within the stormwater treatment system.

"Clean out access pipe" as used herein, refers to that pipe which is within the container and is positioned in a vertical orientation and connected to the horizontally positioned underdrain pipe. This pipe may also serve the dual purpose as the overflow/bypass pipe which evacuates accumulated water within the container which cannot otherwise infiltrate through the layer(s) of inorganic and/or organic materials of the stormwater treatment system.

"Dimensional stone" as used herein, refers to a stone, or rock of a specific size and shape.

"Discrete layer" as used herein, refers to an individual layer which is separate and different from any and all other layers.

"Elevation" refers to a geographic location and its height above or below a fixed reference point. That which is a "raised elevation" rises above its surrounding elevation.

"Filtering media" as used herein, refers to those layers either discrete or in combination of inorganic and/or organic material which have been introduced to and are resident within the container, and potentially exterior of the container. The filtering media allows for the infiltration and flow thru of incoming stormwater and is designed to provide treatment for nutrients and contaminants entrained in the water.

"Fittings" as used herein, refer to those fixtures and furnishings used to connect and interconnect plastic pipe in combination with plumbing and drain systems allowing for multi directional positioning both vertically and horizontal. Fittings could include, but are not limited to, such items as known in the commercial trade as valves, elbows, tees, wyes, and unions, and the like.

"Geotextile fabric material" as used herein, refers to permeable fabrics which have the ability to separate and maintain segregation between two discrete layers of inorganic or organic materials while still allowing for the infiltration of water between the two layers. Geotextile fabrics are typically constructed of fiberglass, polypropylene, polyester, or the like.

"Impermeable material" as used herein, refers to those materials whether natural or synthetic which restrict a thing or force from penetrating said material. Impermeability is the resistance to that potential penetration.

"Impervious subsurface membrane liner" as used herein, refers to a synthetic, flexible material which acts as a barrier to separate and maintain segregation between two discrete layers of inorganic and/or organic materials thus preventing the infiltration of water between the two layers.

"In contact with" as used herein, refers to conditions when an action with one element causes a secondary action in a second element. For instance, when two pipes are "in contact with" each other, stormwater may flow from one pipe to a second pipe when said pipes are "in contact with" each other.

"Interior" refers to the space created when all sidewalls are affixed to each other.

"Inorganic material" refers to matter which is not derived from living organisms and contains no organically produced carbon. It includes rocks, minerals and metals. Inorganic matter can be formally defined with reference to what they are not: organic compounds.

"Manifold pipes" refers to a combination of one or more smaller pipes or channels which lead out from a bigger pipe, typically in a perpendicular radius from the bigger pipe. A manifold is a component that is used to regulate fluid flow in a hydraulic system, thus controlling the transfer of water.

"Open public area" to those areas that are open for public access and use. These areas may be owned by a national or local government body, 'public' body (e.g. a not-for-profit organization) and held in trust for the public, or owned by a private individual or organization but made available for public use or available public access "Organic material" refers to matter that was once alive and is in various states of decomposition. Dead plants, animals, bacteria and fungi are all examples of organic material.

"Overflow or internal bypass conduit" as used herein, refers to a vertical pipe and passage by which to evacuate and convey excess stormwater that enters the container and then rises above the surface of the media and otherwise inundate the container. This condition typically arises when the rate and volume of water entering the container is greater than the ability of the media to infiltrate and transfer the water.

"Partial horizontal top sidewall" as used herein, refers to the top portion of the container, either separate or affixed to the container, which is at least partially open to the surrounding environment.

"Receiving facility" as used herein, refers to those structures or land masses either natural or man-made which receive incoming stormwater from another so defined facility.

"Separating layer" as used herein, refers to an individual layer which is separate and different in characteristics and/or properties from that of the overlying and underlying layers.

"Stormwater" refers to water that originates during precipitation events and snow/ice melt. Stormwater can soak into the soil (infiltrate), be held on the surface and evaporate, or runoff and end up in nearby streams, rivers, or other water bodies (surface water).

"Stormwater receiving receptor" as used herein, refers to those bodies of land or water which receive stormwater from upgradient location associated with the stormwater management system of the present invention. The receptor may be sensitive to and/or otherwise impacted by the receiving waters and potential contaminant load.

"Stormwater treatment system" as used herein, refer to the interior and exterior components of the present invention.

"Straight line pipes" as used herein, refers to those pipes that traverse or travel across a surface in one continuous direction.

"Vertical sidewall" as used herein, refers to one of four sides that form the vertical dimension of the container.

"Watertight"refers to a material or thing that is closely sealed, fastened, or fitted so that no water enters or passes through it.

"Water treatment residual" refers to the waste by-product that is produced as part of water treatment processes to contaminants. These residuals form when suspended solids in the target water react with chemicals (e.g., coagulants) added in the treatment processes and associated process control chemicals (e.g., lime). These residuals have the ability to adsorb or otherwise attract and bind nutrients such as phosphorus to its surface.

BRIEF DESCRIPTION OF THE DRAWINGS

FIGS. 5(a) and 5(b) is a cutaway cross-sectional view, and plan view, respectively, of a fourth embodiment of inflow and outflow pipes and openings of a stormwater management system of the present invention.

FIGS. 7(a) and 7(b) is a cutaway perspective view, and plan view, respectively, of a sixth embodiment of a stormwater management system of the present invention.

These renderings are included for illustrative and interpretive purposes relative to specific embodiments and applications and should not be construed as the sole positioning, configurations, or singular use of the present invention.

DESCRIPTION OF PREFERRED EMBODIMENTS

Figure 1:
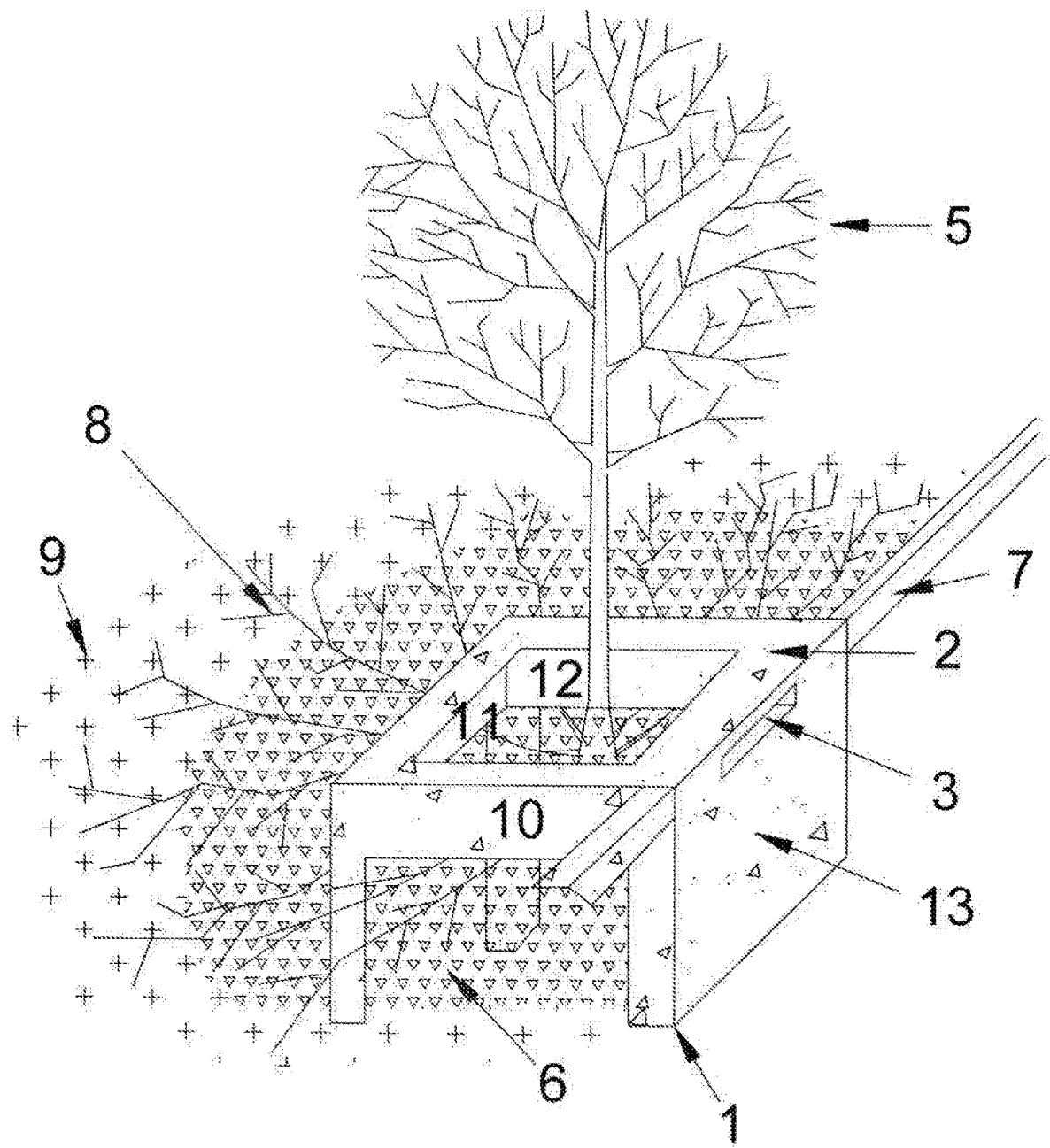
FIG. 1 is a cutaway perspective various aspects of a stormwater treatment system of the present invention.

The present invention is designed to be a stormwater management system hereby stormwater combined with mixed debris, sands, sediment, entrained and dissolved chemical and biological pollutants are separated, treated and/or remediated via physical, chemical, and biological processes prior to being infiltrated to the subsurface environment, and/or discharged to a separate drainage system. Referring now to the drawings, and specifically to FIG. 1, the present invention is comprised of a substantially water impermeable open bottomed container 1 of various dimensions and configurations with an open bottom and vertical sidewalls 10, 11, 12, 13, of various height and enclosure, and horizontal (top) sidewall 2 at least partially open to the environment. The container contains a mixture and/or discreet layer(s) of both organic and inorganic materials (media) which may or may not extend beyond the outside perimeter of the container. The container maintains vegetative plant(s) 5 whose roots 8 are resident in the media and are able to communicate unrestricted with the surrounding native soils or introduced soils 9.

Figure 2:
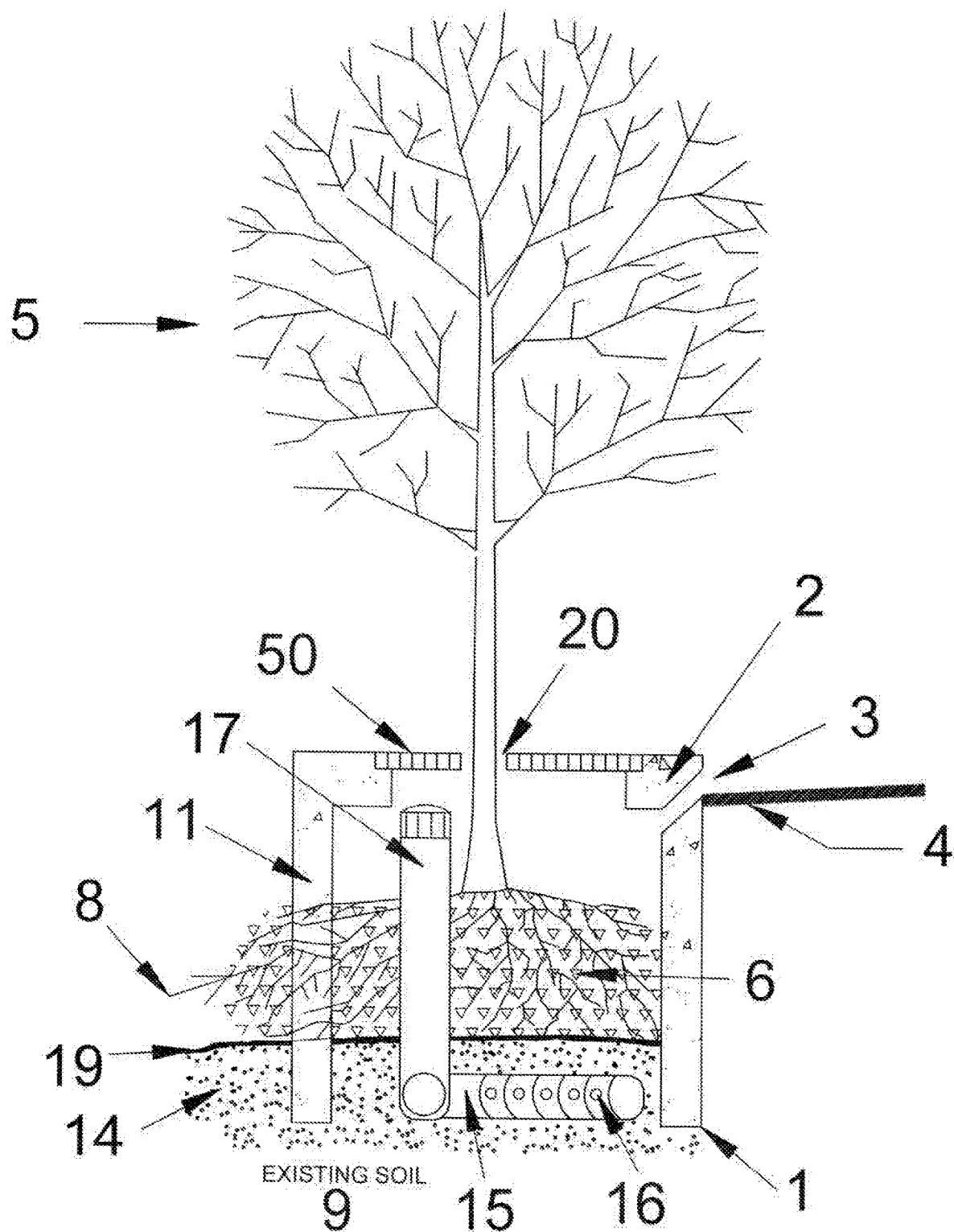
FIG. 2 is a cutaway cross-sectional view of the first embodiment of the stormwater management system of the present invention with internal collection and discharge piping.

While continuing to reference FIG. 1, and also FIG. 2, the following description includes the preferred embodiment, manner of operation, and pollutant removal function(s). Stormwater enters the substantially water impermeable open-bottomed container 1 through one or more openings located on the container or through an opening 3 on a sidewall that abuts a street or impervious surface 4 with associated curbing 7. The preferred embodiment of the container is of a water tight concrete, metal, or plastic (or other impermeable substance) fabrication. The configuration, horizontal dimensions and shape of this container is primarily determined based on site logistics, and the size of the appropriate media dimensions to accommodate the flow emanating from the contribution area that makes up the incoming stormwater flow.

Incoming stormwater flows immediately into the container 1, quantities of sand, sediment, and other floatable or non-floatable matter entrained within the stormwater flow also enters the container and accumulate on the surface of the media 6.

As the water infiltrates through the media, additional quantities of sands and sediment may either become resident in the media or continue entrained with the water flow. Additionally, organic nutrients such as nitrogen and phosphorus, amongst others, and metals such as zinc and copper, amongst others, within the stormwater flow may adhere to the aggregate media and/or continue to pass through the media. The media is comprised of a mixture of aggregates (e.g., sand, gravel, stone), and organics, to achieve a substantial rate of infiltration, while maintaining moisture holding capacity to maintain biological activity and support plant growth. An embodiment would be the incorporation of an additive in the aggregate media that would contain an iron or aluminum oxide product, an expanded ceramic, and/or a water treatment residual of no greater than 20% (±5%) by volume to enhance the nutrient removal potential of the non-amended media.

The water infiltrates through, and then exits the media layer of the container. The infiltrating water than typically communicates with an underlying layer of stone or other aggregate 14. A preferred embodiment would be a "separating" layer 19 consisting of either or both a manufactured geotextile fabric material, and a dimensional stone differing from that of the aforementioned underlying layer of stone/aggregate. The base of the container is envisioned to either rest on top of this stone/aggregate layer, or be partially embedded within this layer. It is envisioned that native soils or introduced soils 9 would be resident below this layer of stone. Depending upon the infiltration capacity of these soils, water would be allowed to freely migrate and/or infiltrate both vertically and horizontally. A preferred embodiment would be that an underdrain pipe 15 is provided adjacent to the bottom of the container within the stone layer 14 having a plurality of openings 16 that receive the infiltrating stormwater as it flows through the overlying media. This stormwater may then be transferred outside the footprint of the container and directed to another receiving facility. Associated with the underdrain pipe is a vertical pipe 17 which serves as either a cleanout access pipe, or as an overflow or internal bypass conduit to collect and transfer incoming stormwater that enters the container and then rises above the surface of the media. This vertical pipe is accessible through an opening(s) in the top sidewall 2. A plastic, fiberglass or metal-based fabricated grate or plate 50 may enclose portions of the top sidewall of the container. An opening 20 within the grate would allow the plant's trunk to extend through the grate and the top sidewall. The grate may be fixed or secured to the top sidewall of the container by way of fastening devices or other appurtenances.

Figure 3A:
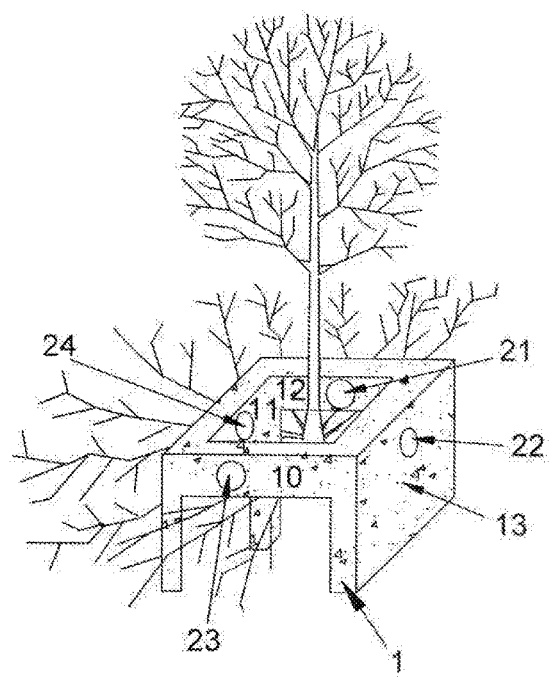
FIGS. 3(a), 3(b), and 3(c) is a cutaway perspective view, plan view, and cutaway perspective view, respectively, of a second embodiment of a stormwater management system of the present invention.
Figure 3B:
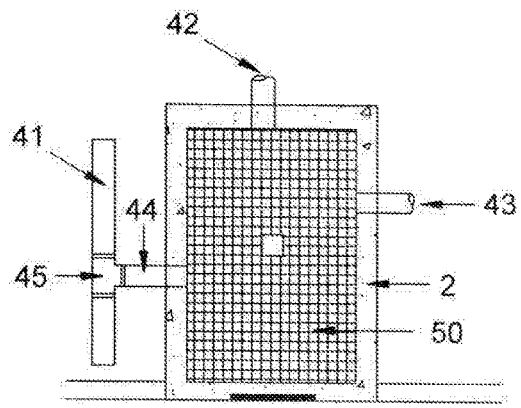
Figure 3C:
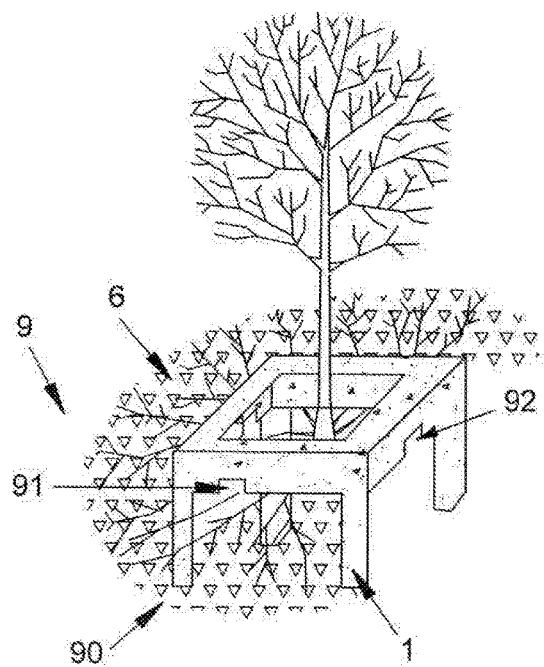

FIGS. 3(*a*), 3(*b*) and 3(*c*) depicts the first embodiment of the present invention which incorporates one or more openings 21, 22, 23, 24 on one or more sidewalls 10, 11, 12, 13 of the container to service one or more incoming and/or outgoing pipes 42, 43, 44 of predetermined dimension and length either straight line or manifold 41 with fittings 45 to receive and/or discharge stormwater communication with the container 1 of the present invention. These pipes could be accessed through the top sidewall 2 of the container, or through a surface grate or plate 50. The ability to connect piping in a multi-directional configuration allows for more flexibility in positioning the stormwater treatment system for both receiving incoming stormwater and discharging outgoing stormwater. Now referring specifically to FIG. 3(*c*), this embodiment incorporates one or more openings 91, 92 on one or more sidewalls of the container 1 to allow for the free movement of water that has accumulated above the media within the container to flow horizontally beyond the exterior walls of the container, and thereby further communicate with the media 6, and adjoining soil 9, providing a more expansive infiltration area.

Figure 4:
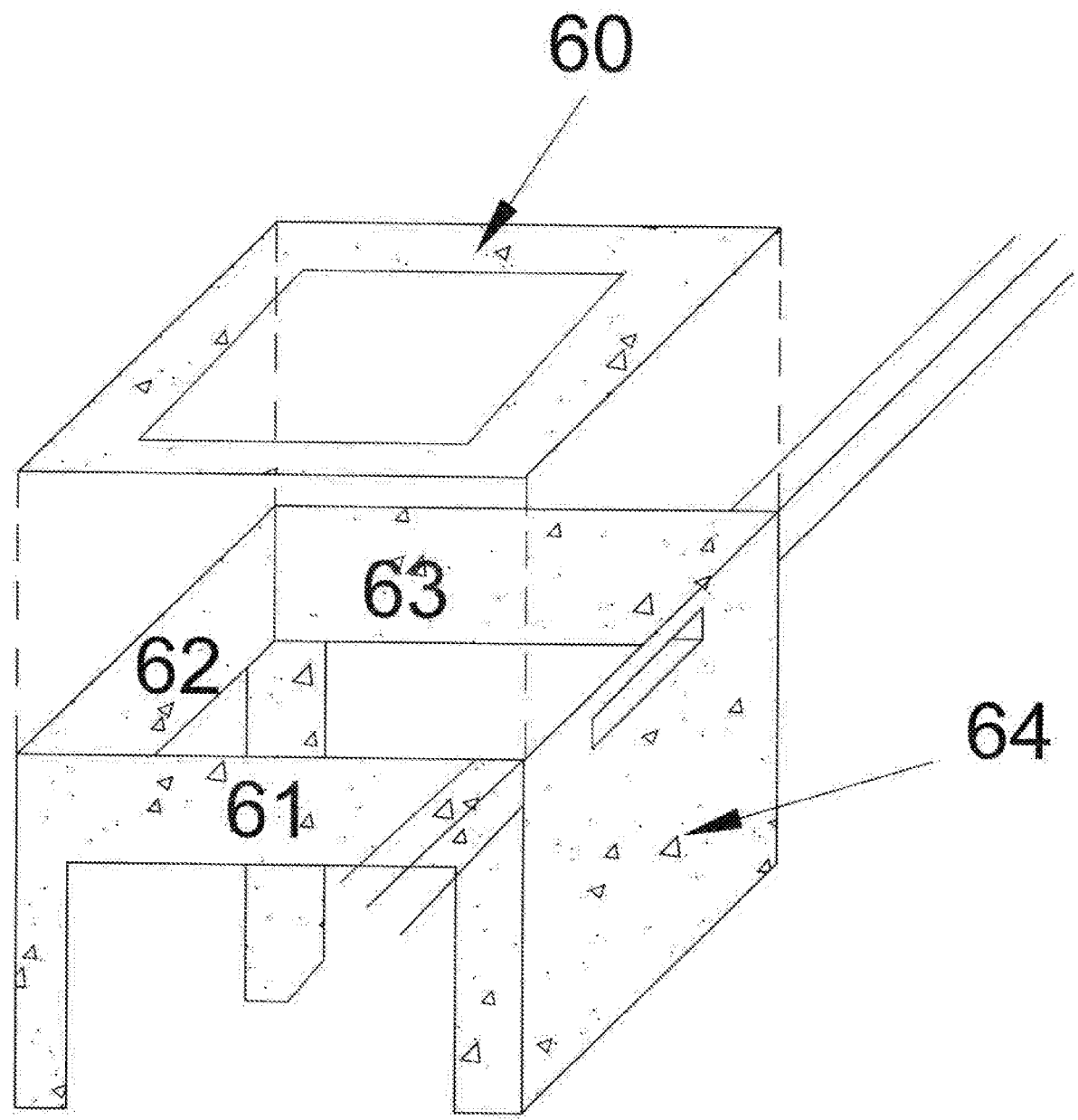
FIG. 4 is a cutaway perspective view of a third embodiment of a stormwater management system of the present invention with a separate top slab.

Now referring to FIG. 4 of a stormwater management system of the present invention, another embodiment of the invention would be that the container would be fabricated in two or more sections with a separate top slab 60 that would rest on or be affixed to the four sides, 61, 62 63, 64 of the container. Having a separate top slab would allow for making slight surficial elevational and side-to-side adjustments if site conditions require such adjustment. A separate top slab would also lessen the overall filling weight of the structure at time of installation particularly for large dimension containers.

FIGS. 5*a*, and 5*b* depict another embodiment of the present invention which allows for incoming pipes from deeper elevations to enter the container. Often times, due to the location and elevation of upgradient catch basins or other facilities that collect stormwater for discharge to a stormwater management system such as the present invention, the point of entry to the container must be several feet below surface grade. Such factors as existing site conditions, drainage layout plans, and natural or artificial slopes, stormwater conveyance pipes must traverse a subject site at elevations several feet below ground surface 70. In this embodiment one or more incoming pipes 71 would enter the container at a depth below ground surface. Incoming water would discharge into a closed bottomed four-sided chamber 72 which is monolithic or attached to the container and would be composed of concrete, metal, or a plastic material. As the water rises within this chamber, it would flow over the interior top sidewall 73 of the chamber, and/or flow through one or more pipes 74 that have been cast in, or are otherwise traversing through the interior sidewall of the chamber. The water would then flow onto the media 6 within the container, and infiltrate through the media, as detailed in the present invention of FIGS. 1 & 2.

Figure 6:
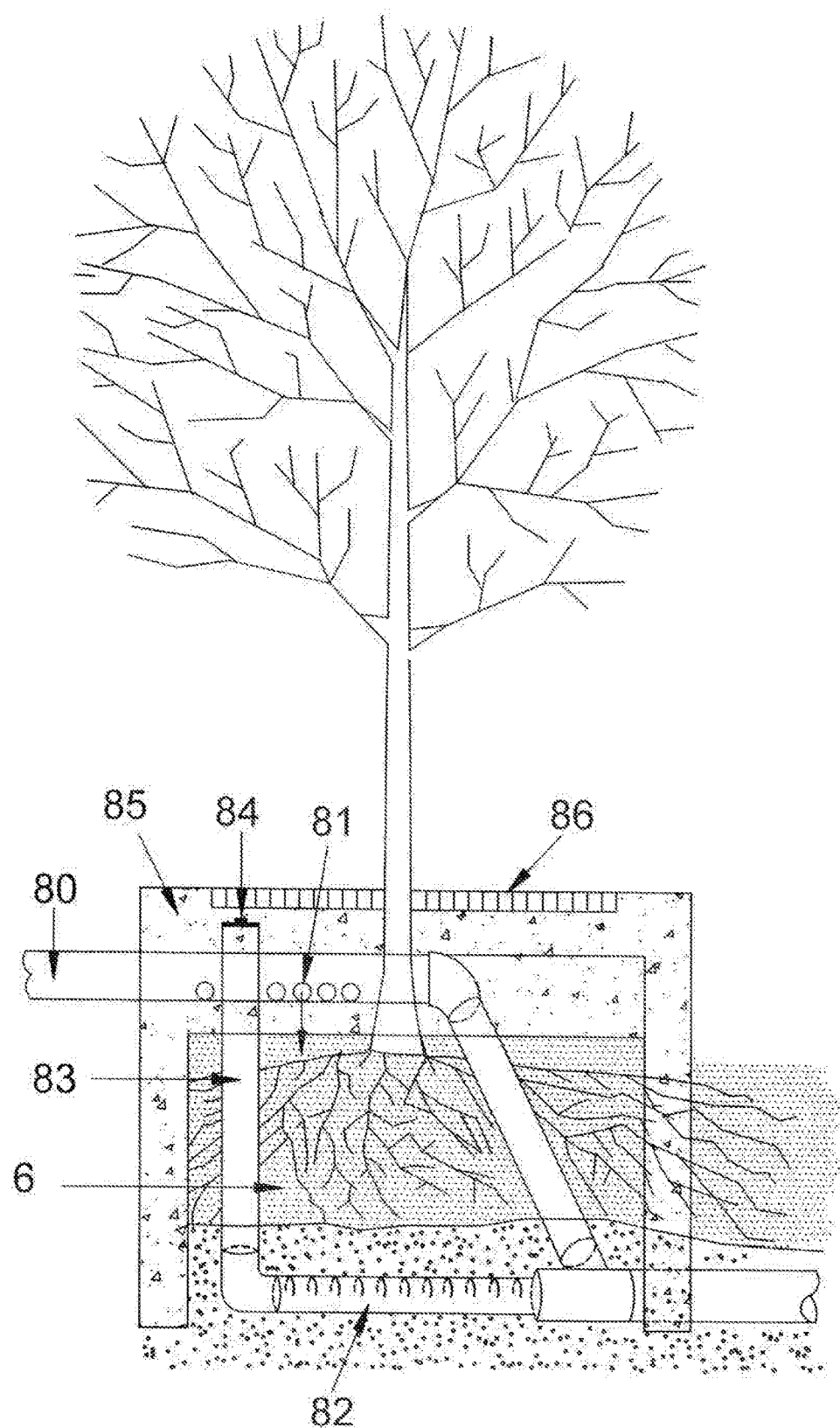
FIG. 6 is a cutaway cross-sectional view of a fifth embodiment of a stormwater management system of the present invention.

FIG. 6 depicts another embodiment which illustrates a particular piping schematic of the present invention as a stormwater management system that accepts incoming water from an underground pipe emanating from either a building's roof, or an upgradient source or location such as an underground pipe, catch basin and/or other storm water receiving receptor. Water enters the container from an inlet pipe 80 situated on a primarily horizontal plane. Water passing over one or more openings 81 located on the inlet pipe, would have the ability to flow through the openings and make contact with the surface of the media 6 within the container. Water which is not able to flow through the aforementioned openings, would continue to flow through the pipe before connecting with a separate underdrain pipe 82 with a plurality of openings that is collecting infiltrating water flow. Both flows would then combine and continue on a primarily horizontal plane and then exit through one or more sides of the container. An embodiment would be that a vertical riser pipe 83 with an open or closed top 84 may be connected to the horizontal underdrain pipe. The purpose of this pipe would be to collect water that rises above the surface of the media within the container for evacuation through the underdrain pipe, or another outlet point; and/or to serve as a cleanout port to be accessed through an opening in the top 85 of the container or through an associated grate, plate or other removable fixture 86.

FIGS. 7a and 7b depicts still another embodiment with similar configuration to previous figures represented of the present invention. In this embodiment, a flexible impervious or semi-impervious subsurface membrane liner 55 surrounds a substantial portion of the container 1. The purpose of this liner would be to provide a barrier between the container and media 6 associated with the container, and that of native or adjoining soils 56. Inlet and outlet piping of various diameter would be able to penetrate and otherwise traverse the wall of the liner. Such circumstances which may include this embodiment would be if the stormwater management system of the present invention was located proximal to identified sensitive environmental receptors which require protection or segregation. Such examples of these receptors could be water bodies 57, wetlands, drinking water protection areas and other examples. Another circumstance where the embodiment of a liner and/or barrier would be beneficial would be if contaminated soil or groundwater was present proximal to the stormwater management system, whereby infiltrating water associated with the stormwater management system could potentially comingle with or otherwise make contact with contaminated soil or groundwater thereby spreading the contamination further. The use of a flexible liner would also allow for the expansion of the collection and treatment area beyond the "foot print" of the container, and therefore not be constrained by the dimensions of the container, allowing for the maximization of the filtrating media area. The flexible impervious or semi-impervious subsurface membrane liner is envisioned to be composed of rubber, polyethylene, or other material(s) either unique or in composite and typically designed to be a barrier to separate one physical area from another physical area.

Several of the embodiments of the invention may be connected to a sump pump. A sump pump is a pump used to remove water that has accumulated in a water collecting sump basin, commonly found in the basement of homes. The water may enter the perimeter drains of a basement waterproofing system, funneling into the basin or because of rain or natural ground water, if the basement is below the water table level. Sump pumps are used where basement flooding happens regularly and to solve dampness where the water table is above the foundation of a home. Sump pumps send water away from a house to any place where it is no longer problematic, such as the stormwater treatment system of the present invention.

There are generally two types of sump pumps—pedestal and submersible. In the case of the pedestal pump, the motor is mounted above the sump—where it is more easily serviced, but is also more conspicuous. The pump impeller is driven by a long, vertical extension shaft and the impeller is in a scroll housing in the base of the pump. The submersible pump, on the other hand, is entirely mounted inside the sump, and is specially sealed to prevent electrical short circuits. There is debate about which variety of sump pump is better. Pedestal sump pumps usually last longer (25 to 30 years) if they are installed properly and kept free of debris. They are less expensive and easier to remove. Submersible pumps will only last 5 to 15 years. They are more expensive to purchase but can take up debris without clogging.

Sump pump systems are also utilized in industrial and commercial applications to control water table-related problems in surface soil. An artesian aquifer or periodic high water table situation can cause the ground to become unstable due to water saturation. As long as the pump functions, the surface soil will remain stable. These sumps are typically ten feet in depth or more; lined with corrugated metal pipe that contains perforations or drain holes throughout. They may include electronic control systems with visual and audible alarms and are usually covered to prevent debris and animals from falling in.

The foregoing descriptions and drawings should be assumed as illustrative only of the principles of the invention. The invention may be configured in a variety of shapes and sizes and is not limited by the aforementioned dimensions, construction and operation of the identified parts, materials or embodiments. It is understood that numerous modifications, changes, and substitutions of the invention will readily occur to those skilled in the art and may be resorted to falling within the scope and spirit the invention.

While the previous description contains many specifics, these should not be construed as limitations on the scope of the invention, but as exemplifications of the presently preferred embodiments thereof. Thus the scope of the invention should be determined by the appended claims and their legal equivalents. It is not desired to be limited to the exact details of construction shown and described for obvious modifications will occur to a person skilled in the art, without departing from the spirit and scope of the appended claims.

I claim:

1. A stormwater treatment system with bioretention functionality comprising at least four substantially open vertical sidewalls and a partial horizontal top sidewall affixed to one or more of said sidewalls, wherein when said system is partially buried in the ground, said partial horizontal top sidewall exposes the interior of the system to the atmosphere; further wherein said system contains discrete layers of organic and inorganic or a mixture of organic and inorganic material; provided said system does not have a bottom wall or a sump.

2. The stormwater treatment system according to claim 1, wherein said organic and inorganic material is confined to the interior of the system.

3. The stormwater treatment system according to claim 1, wherein said organic and inorganic material extends under and out of said system.

4. The stormwater treatment system according to claim 1, wherein said inorganic material is an aggregate media.

5. The stormwater treatment system according to claim 4, wherein said aggregate media comprises sand, gravel, stone or any combination thereof.

6. The stormwater treatment system according to claim 5, wherein said inorganic media further comprises organic material, provided said inorganic media can filter stormwater entering the system while maintaining moisture to support vegetation growth.

7. The stormwater treatment system according to claim 6, wherein said inorganic media further comprises an additive comprised of iron or aluminum oxide, an expanded ceramic, or a water treatment residual no greater than 20% (±5%) by volume or any combination thereof.

8. The stormwater treatment system according to claim 7, wherein said system contains a third discrete layer of material situated below the organic and inorganic layers comprising stone or aggregate or a combination thereof.

9. The stormwater treatment system according to claim 8, further comprising a separating layer situated below said third discrete layer.

10. The stormwater treatment system according to claim 9, wherein said separating layer comprises a manufactured geotextile fabric material and/or dimensional stone, provided said dimensional stone is different from the stone comprising the third layer immediately above the separating layer.

11. The stormwater treatment system according to claim 9, further comprising a base situated above or embedded within said separating layer.

12. The stormwater treatment system according to claim 9, wherein soil is located below said separating layer.

13. The stormwater treatment system according to claim 12, further comprising a horizontal under drain pipe embedded with said base and/or separating layer wherein when said drain pipe directs filtered stormwater out of the system into the surrounding ground or to a receiving facility.

14. The stormwater treatment system according to claim 13, wherein said horizontal under drain pipe contains a plurality of openings.

15. The stormwater treatment system according to claim 13, further comprising a vertical pipe extending via the exposed interior formed by the partial horizontal top sidewall wherein said vertical pipe is a clean out access pipe or an overflow or internal bypass conduit or both which directs excess stormwater that enters the system and accumulates at the top of said system out of the system.

* * * * *